(12) United States Patent
Aupetitgendre et al.

(10) Patent No.: US 9,644,680 B2
(45) Date of Patent: May 9, 2017

(54) ROLLING BEARING COMPRISING A SEALING FLANGE

(71) Applicants: Elie Aupetitgendre, St-Cyr-sur Loire (FR); Laurent Varnoux, Saint Avertin (FR)

(72) Inventors: Elie Aupetitgendre, St-Cyr-sur Loire (FR); Laurent Varnoux, Saint Avertin (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/968,966

(22) Filed: Dec. 15, 2015

(65) Prior Publication Data

US 2016/0169286 A1  Jun. 16, 2016

(30) Foreign Application Priority Data

Dec. 15, 2014  (FR) ..................... 14 62424

(51) Int. Cl.
*F16C 33/76* (2006.01)
*F16C 33/78* (2006.01)

(52) U.S. Cl.
CPC ........ *F16C 33/7886* (2013.01); *F16C 33/768* (2013.01); *F16C 33/782* (2013.01); *F16C 33/783* (2013.01); *F16C 33/7863* (2013.01); *F16C 33/7896* (2013.01)

(58) Field of Classification Search
CPC .............. F16C 33/7853; F16C 33/7863; F16C 33/7883; F16C 33/7896; F16J 15/3268
See application file for complete search history.

(56) References Cited

U.S. PATENT DOCUMENTS

| 2002/0015543 A1* | 2/2002 | Pairone ................. F16C 33/785 384/477 |
| 2002/0191877 A1 | 12/2002 | Suzuki et al. |
| 2012/0098208 A1* | 4/2012 | Yamamoto ............... F16J 15/14 277/549 |
| 2013/0287329 A1* | 10/2013 | Varnoux ............. F16C 33/7859 384/485 |

FOREIGN PATENT DOCUMENTS

| DE | 3212976 A1 | 10/1983 | |
| DE | 102012202592 A1 | 8/2013 | |
| EP | 1167793 A2 | 1/2002 | |
| GB | 825364 A * | 12/1959 | .......... F16C 33/7886 |
| IT | EP 0198324 A2 * | 10/1986 | .......... F16C 33/7859 |
| JP | 11351263 A * | 12/1999 | |
| JP | H11351263 A | 12/1999 | |
| WO | 2011/121385 A1 | 10/2011 | |

\* cited by examiner

*Primary Examiner* — Phillip A Johnson
(74) *Attorney, Agent, or Firm* — Bryan Peckjian; SKF USA Inc. Patent Dept.

(57) ABSTRACT

A rolling bearing comprising an outer ring, an inner ring, at least one row of rolling elements disposed radially between the rings, at least one sealing flange mounted in a manner to bear axially against a front surface of one of the rings, and a feature for fixing the sealing flange to the ring. The fixing feature at least locally covers a region of the front surface of the ring that is left free by the sealing flange and a part of the flange that is adjacent to the region. The fixing feature is annular.

9 Claims, 3 Drawing Sheets

ROLLING BEARING COMPRISING A SEALING FLANGE

CROSS REFERENCE TO RELATED APPLICATION

This is a Non-Provisional Patent Application, filed under the Paris Convention, claiming the benefit of France (FR) Patent Application Number 1462424, filed on 15 Dec. 2014 (15.12.2014), which is incorporated herein by reference in its entirety.

FIELD OF THE INVENTION

The present invention relates to the field of rolling bearings and in particular those used in automotive or industrial applications.

BACKGROUND OF THE INVENTION

In a rolling bearing, one or more seals are generally used to keep the lubricant, such as grease, inside the bearing and to limit the ingress of contaminating particles. Generally, such seals are fixed to one of the rings of the bearing and engage with the other ring so as to form a dynamic seal.

Patent application WO-A1-2011/121385 (SKF) describes a rolling bearing comprising two seals that are fixed to the outer ring and each comprise an internal lip in rubbing contact with the inner ring. The bearing also comprises two sealing flanges that are fixed to the inner ring and each comprises an external lip that rubs against the associated seal. Each sealing flange comprises a radial portion that is mounted axially against a front surface of the inner ring and which is extended by a fixing portion folded inside an annular groove formed in the bore of the ring.

In operation, contaminating particles can be introduced through the space(s) existing between the fixing portion of the sealing flange and the groove in the inner ring, and can then reach the internal lip of the seal in rubbing contact with the ring. Specifically, the flange is formed from a sheet metal blank by bending, cutting and pressing. Moreover, the fixing portion of the flange is force-fitted inside the groove in the inner ring. Consequently, this fixing portion of the flange is not perfectly straight with good flatness. Narrow passages can thus remain between the outer surface of the fixing portion of the flange and the groove in the inner ring.

SUMMARY OF THE INVENTION

The present invention aims to remedy this drawback.

More specifically, the present invention seeks to provide a rolling bearing that comprises an improved sealing flange.

The present invention also aims to provide a rolling bearing that is easy to manufacture and assemble.

In one embodiment, the rolling bearing comprises an outer ring, an inner ring, at least one row of rolling elements disposed radially between the rings, at least one sealing flange mounted so as to bear axially against a front surface of one of the rings, and means for fixing the sealing flange to the ring.

The fixing element at least locally covers a region of the front surface of the ring that is left free by the sealing flange. The fixing element covers a part of the flange that is adjacent to the region. The fixing element is annular.

The fixing element fixes the sealing flange to the front surface of the associated ring and ensures the seal between the flange and the ring in the fixing region. The annular shape of the fixing element makes it possible to obtain a continuous seal in the circumferential direction between the flange and the front surface of the associated ring. Thus, the intrusion of contaminating particles between the sealing flange and the front surface of this ring is prevented. Furthermore, while the ring is being manufactured, it is not necessary to provide an additional machining operation for forming a groove in the bore or in the outer surface of the ring in order to fix the sealing flange.

Preferably, the sealing flange comprises a radial mounting portion that is mounted so as to bear axially against the front surface of the ring and is provided with a free end edge situated radially between the bore and the outer surface of the ring.

In one embodiment, the fixing element covers the free end edge of the mounting portion of the sealing flange. Alternatively, the fixing element cover a part of the internal face of the sealing flange, the internal face being situated radially on the side away from the free end edge when considering the mounting portion of the flange.

In a preferred embodiment, the fixing element comprises a bead of material, for example a bead of adhesive or a welding bead.

In a preferred embodiment, the bearing also comprises at least one seal that is fixed to the other ring and engages with the ring, the sealing flange being axially offset with respect to the seal on the outer side of the bearing. The sealing flange may be mounted axially in contact with the seal.

The sealing flange may be mounted axially in direct contact with the front surface of the other ring.

BRIEF DESCRIPTION OF THE FIGURES

The present invention will be better understood from reading the detailed description of embodiments which are given by way of entirely non-limiting example and are illustrated by the appended drawings, in which.

DETAILED DESCRIPTION OF THE EMBODIMENTS

Figure 1:
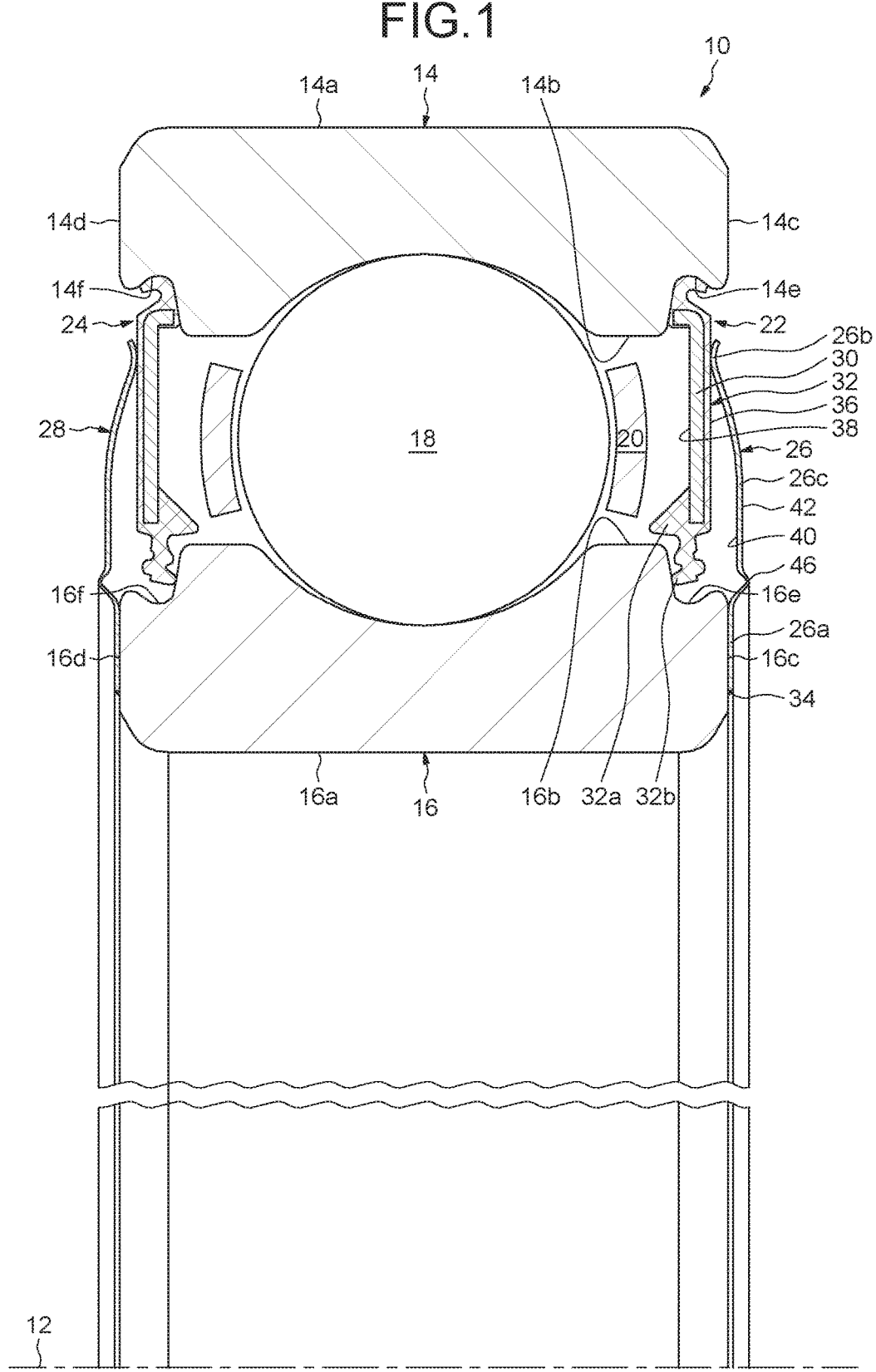
FIG. 1 is a half view in axial section of a rolling bearing according to a first example of the invention.

In FIG. 1, a rolling bearing 10, of axis 12, comprises an outer ring 14, an inner ring 16, a plurality of rolling elements 18, in this case in the form of balls that are disposed radially between the rings and a cage 20 for maintaining the regular circumferential spacing of the rolling elements. The bearing 10 comprises, axially on each side, an annular seal 22, 24 for closing the radial space that exists between the outer ring 14 and inner ring 16, and an annular sealing flange 26, 28 that bears axially against the seal 22, 24 on the outer side of the bearing. In the illustrated example, the seals 22, 24 are fixed to the outer ring 14, while the sealing flanges 26, 28 are fixed to the inner ring 16.

The outer ring 14 comprises a cylindrical axial outer surface 14a, a cylindrical bore 14b, two opposite radial front surfaces 14c, 14d that axially delimit the bore and the outer surface, and a raceway that is formed on the bore 14b and has in cross section a concave internal profile suitable for the rolling elements 18, the raceway being directed radially inwards. The outer ring 14 also comprises two annular grooves 14e, 14f that are formed in the bore 14b and extend radially outwards. The grooves 14e, 14f are disposed respectively in the vicinity of the front surfaces 14c, 14d. Each groove 14e, 14f is disposed axially between the rolling elements 18 and one of the front surfaces 14c, 14d. The grooves 14e, 14f are mutually symmetric about a radial median plane passing through the centre of the bearing 10.

The inner ring 16 comprises a cylindrical bore 16a, a cylindrical axial outer surface 16b, two opposite radial end front surfaces 16c, 16d that axially delimit the bore and the outer surface, and a raceway that is formed on the outer surface 16b and has in cross section a concave internal profile suitable for the rolling elements 18, the raceway being directed radially outwards. The front surfaces 16c, 16d are flat. The front surfaces 16c, 16d are smooth, i.e. do not have ribs, protrusions, notches, grooves, etc. The cage 20 is disposed radially in the radial space delimited by the outer surface 16b of the inner ring and the bore 14b of the outer ring.

The inner ring 16 also comprises two annular grooves 16e, 16f that are formed in the outer surface 16b and extend radially inwards. The grooves 16e, 16f are disposed respectively in the vicinity of the front surfaces 16c, 16d. The grooves 16e, 16f are mutually symmetric about a radial median plane of the bearing 10. The groove 16e, 16f is radially opposite the corresponding groove 14e, 14f.

The outer ring 14 and inner ring 16 are concentric. In the illustrated example, the rings are solid. A "solid ring" is understood to be a ring of which the shape is obtained by machining with removal of chips (by turning or grinding) from tubes, bar stock, forged and/or rolled blanks.

Each seal 22, 24 is disposed radially between the outer ring 14 and inner ring 16 and fixed to the outer ring, being disposed laterally with respect to the rolling elements 18. Each seal 22, 24 is fixed inside one of the grooves 14e, 14f in the outer ring. Each seal 22, 24 is housed entirely inside the radial space delimited by the outer ring 14 and inner ring 16. Each seal 22, 24 is axially offset on the inner side of the bearing 10 with respect to the associated side surface 14c, 14d of the outer ring.

In this illustrated example, the seals 22, 24 are identical to one another and symmetric with respect to the radial median plane of the bearing 10. Since the seals 22, 24 are identical here, only one of them will be described.

The seal 22 comprises a rigid annular armature or insert 30 and a flexible annular sealing gasket 32 fixed to the insert. The insert 30 is made from a rigid material, for example from metal material or thermoplastic material, in particular polyamide. The insert 30 forms a reinforcing insert for the gasket 32. The gasket 32 is molded or vulcanized onto the insert 30. The gasket 32 is made from a flexible material, for example elastomer such as a nitrile rubber or thermoplastic elastomer material.

The gasket 32 covers an outer surface of the insert 30. The gasket 32 covers an external side face of the insert 30. The gasket 32 comprises an annular external side face 36 that is oriented axially on the outer side of the bearing 10 in the direction of the associated flange 26. The side face 36 of the gasket forms the external side face of the seal 22. The side face 36 is flat. The side face 36 extends radially. An internal side face 38 of the seal away from the side face 36 is oriented axially towards the inside of the bearing in the direction of the rolling elements 18. The internal side face 38 is delimited by the insert 30.

The gasket 32 forms two radially opposite sealing portions that respectively bring about a static seal with the outer ring 14 and a dynamic seal with the inner ring 16. A "static seal" is understood to mean the seal produced between two components without relative movement and a "dynamic seal" is understood to mean a seal between two components exhibiting relative movement.

The outer sealing portion of the gasket 32 is force-fitted into the groove 14e in the outer ring 14 in order to fix the seal 22 to the ring. The inner sealing portion of the gasket 32 comprises first and second concentric annular internal lips 32a, 32b that extend axially towards the inside of the bearing. The internal lip 32b bears axially against a radial wall of the groove 16e in the inner ring. The internal lip 32a has a diameter greater than the internal lip 32b and radially surrounds the outer surface 16b of the inner ring so as to form a narrow passage of the labyrinth type with the outer surface.

Each sealing flange 26, 28 is offset axially with respect to the associated seal 22, 24 on the outer side of the bearing. Each sealing flange 26, 28 is mounted so as to bear axially against one of the front surfaces 16c, 16d of the inner ring and bears against the sealing gasket 32 of the associated seal axially on the outer side of the bearing 10. The flanges 26, 28 are mutually symmetric about a transverse radial plane passing through the centre of the bearing 10. Since the flanges 26, 28 are identical in the illustrated example, only one of them will be described here.

The flange 26 is made in one piece. The flange 26 is made from a rigid material, for example from metal material advantageously from a sheet metal blank by cutting and pressing. Alternatively, the flange 26 may be made from some other rigid material, for example from synthetic material such as polyamide.

The flange 26 is fixed to the inner ring 16 outside the radial space that exists between the ring and the outer ring 14. As will be described in more detail below, the flange 26 is fixed to the front surface 16c of the inner ring by annular fixing element 34 attached to the flange and to the ring. The fixing element 34 is separate from the flange 26 and from the inner ring 16. The fixing element 34 is disposed outside the radial space that exists between the inner ring 16 and the outer ring 14. The flange 26 extends radially in the direction of the outer ring 14. The flange 26 is mounted axially in contact with the front surface 16c of the inner ring.

The flange 26 bears axially against the external side face 36 of the seal. In the illustrated example, the flange 26 is mounted so as to bear axially against the side face 36 close to the outer sealing portion of the sealing gasket 32. The flange 26 comprises an internal side face 40 that is oriented axially on the side of the seal 22 and bears locally against the seal, and an external side face 42 that is oriented axially on the outer side of the bearing. The flange 26 is mounted in direct contact with the seal 22.

The flange 26 comprises an annular mounting portion 26a mounted so as to bear axially against the front surface 16c of the inner ring and a portion 26b for bearing against the seal 22 which has an annular shape and is in axial contact with the external side face 36 of the seal. The mounting portion 26a has a radial shape and forms an inner portion of the flange. The mounting portion 26a comprises a free end edge 44 (FIG. 2) that delimits the bore of the flange 26. The end edge 44 forms a small-diameter inner edge of the mounting portion 26a, and more generally of the flange 26. The end edge 44 delimits the flange 26 radially on the inner side. The flange 26 does not have a portion extending the end edge 44. The end edge 44 is situated radially between the bore 16a and the outer surface 16b of the inner ring. The end edge 44 is situated radially along the front surface 16c of the inner ring. The end edge 44 is axially adjacent to the front surface 16c.

The bearing portion 26b forms an external portion or end portion of the flange. In the illustrated example, the bearing portion 26b has a curved shape that is concave axially on the outer side and is convex axially on the inner side. Only the bearing portion 26b of the flange is mounted in contact with the seal 22.

The flange 26 also comprises an annular connecting portion 26c extending between the fixing portion 26a and bearing portion 26b, being connected to the portions. The connecting portion 26c radially extends a large-diameter end edge of the mounting portion 26a and is extended radially by the bearing portion 26b. The connecting portion 26c is designed to be flexible and elastically deformable in the axial direction. The connecting portion 26c extends inwards in the direction of the seal 22. In the illustrated example, the connecting portion 26c has a curved shape axially towards the inside of the bearing 10.

A wave or undulation 46 is formed on the connecting portion 26c so as to further promote the flexible and elastically deformable nature in the axial direction of this portion. The undulation 46 extends axially on the outer side of the bearing 10. In the illustrated example, the undulation 46 extends from the large-diameter end edge of the mounting portion 26a of the flange. The flange 26 comprises a single undulation 46 here. Alternatively, the flange 26 could comprise a plurality of successive undulations in the radial direction or other shapes that promote the elastic deformation of the connecting portion 26c.

Figure 2:
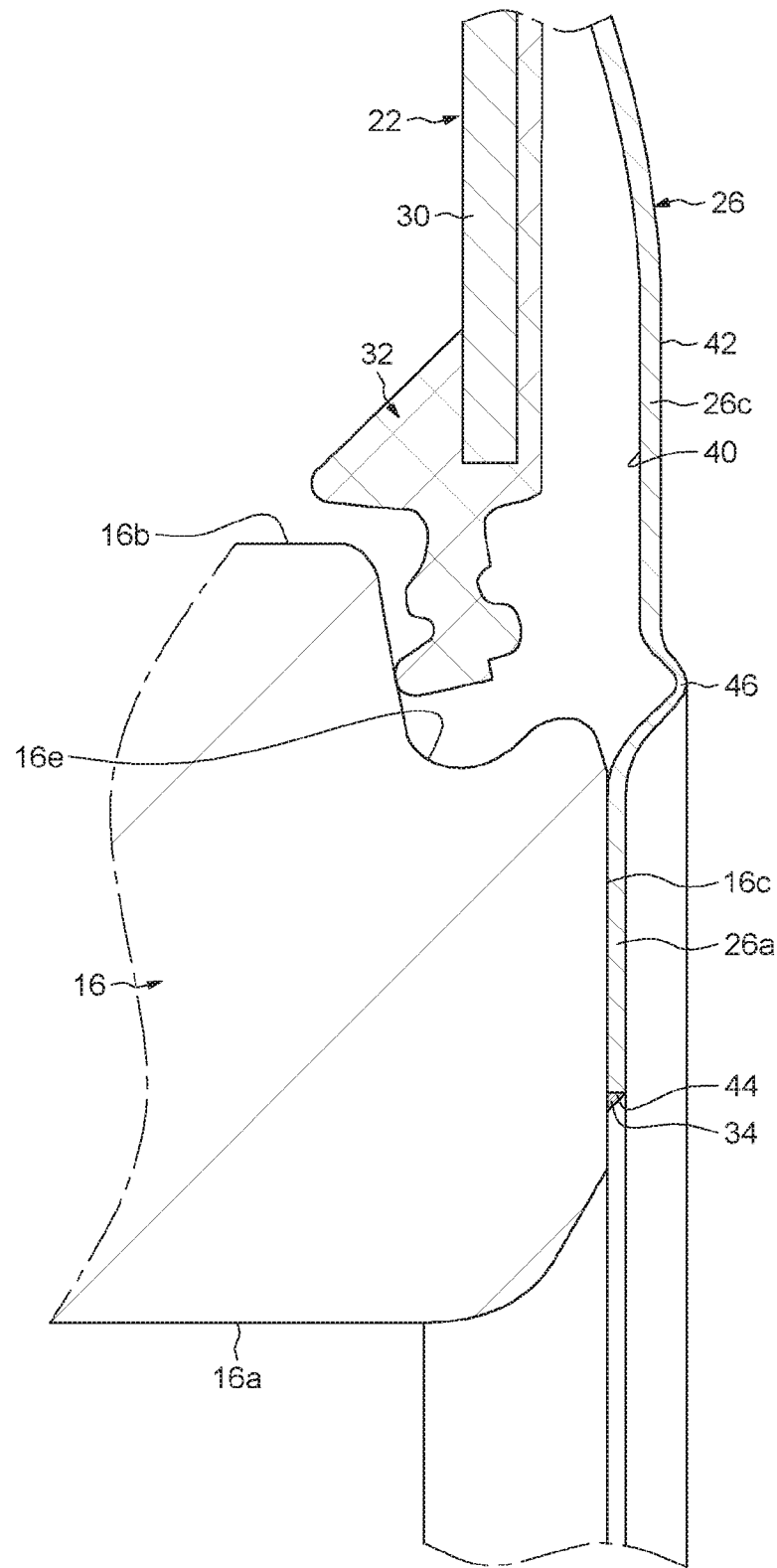
FIG. 2 is a detail view of FIG. 1.

As illustrated more clearly in FIG. 2, the fixing element 34 cover the free end edge 44 of the sealing flange and locally cover the adjacent region of the front surface 16c of the inner ring that is left free by the flange. In the illustrated example, the adjacent region that is left free by the flange is offset radially inwards with respect to the end edge 44 of the flange, and more generally with respect to the flange. The fixing element 34 is in the form of an annular bead of material, and can be for example a bead of adhesive or a welding bead. The fixing element 34 forms a fixing bead. The fixing element 34 is continuous in the circumferential direction.

The fixing element 34 fulfill a double function, namely that of fixing the sealing flange 26 to the front surface 16c of the inner ring and ensuring the seal between the flange 26 and the front surface. The annular shape of the fixing element 34 makes it possible to obtain a continuous seal in the circumferential direction between the end edge 44 of the flange and the front surface 16c of the ring. Thus, the intrusion of contaminating particles between the sealing flange 26 and the inner ring 16 is prevented.

Furthermore, the axial contact between the sealing flange 26 and the external side face 36 of the seal makes it possible to limit the intrusion of contaminating particles between the flange and the seal. In the illustrated example, the flange 26 is deformed axially towards the outside of the bearing by the contact between the bearing portion 26b and the seal 22. The connecting portion 26c of the flange is deformed counter to its inherent elasticity. The flange 26 is preloaded axially by the contact with the seal 22. In the preloaded state, the axial spacing between the mounting portion 26a and the bearing portion 26b on the side of the internal face 40 of the flange is smaller than the axial spacing between the portions in the free state or unstressed state of the flange. By elasticity, the connecting portion 26c of the flange tends to return to its position in which it is not loaded or not stressed axially. The bearing portion 26b of the flange therefore exerts a permanent axial preloading force on the seal 22. This makes it possible to maintain the axial sliding contact between the flange 26 and the seal 22.

Figure 3:
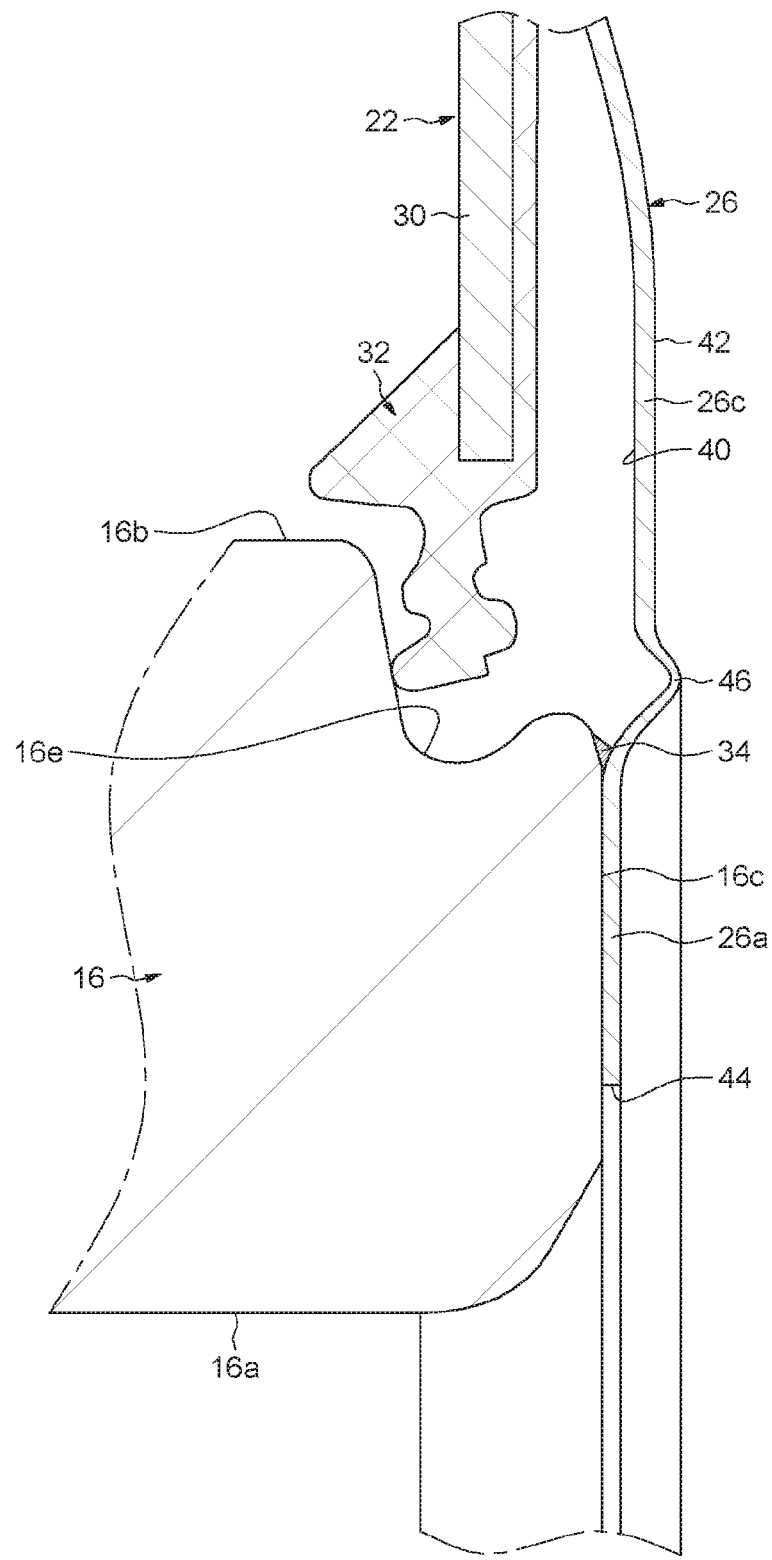
FIG. 3 is a detail view of a rolling bearing according to a second example of the invention.

The example illustrated in FIG. 3, in which identical elements have the same references, differs from the first example only by way of the disposition of the annular fixing element 34. The fixing element 34 locally cover the region of the front surface 16c of the inner ring that is left free by the sealing flange which is offset radially towards the outside of the bearing with respect to the mounting portion 26a of the flange. The fixing element 34 cover a part of the internal side face 40 of the flange which is adjacent to and axially opposite the region. This part of the internal side face 40 of the flange is situated radially on the side away from the end edge 44 when considering the mounting portion 26a of the flange. In illustrated example, the fixing element 34 may be for example a bead of adhesive.

In the illustrated examples, each flange is elastically deformable in the axial direction so as to maintain the axial contact between the flange and the associated seal. As a variant, it may be possible, however, to provide flanges that are not elastically deformable. As a variant, it may also be possible to provide a different design of the seals. Each seal could comprise an external lip that rubs against the internal face of the associated flange.

In the illustrated examples, the sealing flange is fixed to the inner ring and the associated seal is fixed to the outer ring. Alternatively, it may be possible to provide a reverse disposition with the seal fixed to the inner ring and the associated flange fixed to the outer ring. In this case, the fixing element can be disposed so as to cover a free end edge of the mounting portion of the sealing flange delimiting the outside diameter of the flange. This edge forms a large-diameter edge of the flange. The fixing element locally cover the region of the front surface of the outer ring that is left free by the sealing flange which is offset radially towards the outside with respect to the large-diameter free end edge of the flange. Alternatively, when the flange is fixed to the outer ring, the fixing element can locally cover the region of the front surface of the outer ring that is left free by the sealing flange which is offset radially towards the inside with respect to the mounting portion of the flange, and can cover a part of the internal side face of the flange which is adjacent to and axially opposite the region.

In another variant embodiment, it may also be possible not to provide a seal associated with each sealing flange. In this case, each flange can engage with the ring towards which the flange extends so as to form a narrow-passage seal.

What is claimed is:

1. A rolling bearing comprising:
    a first ring;
    a second ring;
    at least one row of rolling elements disposed radially between the first ring and the second ring;
    a sealing flange mounted in a manner to bear axially against a front surface of the first ring, the sealing flange comprising a mounting portion that extends radially between a radially inner edge and a radially outer edge, the mounting portion further comprising an axially inner, radially extending surface and an axially outer, radially extending surface that each extend between the radially inner edge and the radially outer edge, the axially inner, radially extending surface bearing axially against the front surface of the first ring, the sealing flange further comprising an undulation that extends from one of the radially outer edge and the radially inner edge of the mounting portion and forms a concave shape with respect to the at least one row of rolling elements, the undulation comprising first and second portions wherein the first portion extends from the one of the radially outer edge and the radially inner edge of the mounting portion in a direction axially away from the first ring and ending at an end point, the second portion extending from the end point in a direction axially towards the first ring such that, with respect to the axial direction, the end point is the portion of the sealing flange that is farthest from the first ring; and a fixing element for fixing the sealing flange to the first ring, wherein the fixing element at least locally covers a region of the front surface of the first ring that is left free by the sealing flange and a part of the sealing flange is adjacent to the region, wherein the fixing element is annular in shape.

2. The rolling bearing according to claim 1, wherein the other one of the radially outer edge and the radially inner edge is a free end edge situated radially between a bore and an outer surface of the first ring.

3. The rolling bearing according to claim 2, wherein the fixing element covers the free end edge of the mounting portion of the sealing flange.

4. The rolling bearing according to claim 1, the fixing element further comprising a bead of material.

5. The rolling bearing according to claim 1, the fixing element further comprising a bead of adhesive.

6. The rolling bearing according to claim 1, the fixing element further comprising a welding bead.

7. The rolling bearing according to claim 1, further comprising at least one seal that is fixed to the second ring and engages with the first ring, wherein the sealing flange is axially offset with respect to the at least one seal on the outer side of the rolling bearing.

8. The rolling bearing according to claim 7, wherein the sealing flange is mounted axially in contact with the at least one seal, the rolling bearing being configured such that when fully assembled the sealing flange is axially preloaded such that a first axial distance between an inner radial end of the sealing flange and an outer radial end of the sealing flange when fully assembled is less than a second axial distance between the inner radial end of the sealing flange and the outer radial end of the sealing flange in a free state.

9. A rolling bearing comprising:

a first ring;

a second ring;

at least one row of rolling elements disposed radially between the first ring and the second ring;

a sealing flange mounted in a manner to bear axially against a front surface of the first ring; and a fixing element for fixing the sealing flange to the first ring, wherein the fixing element at least locally covers a region of the front surface of the first ring that is left free by the sealing flange and a part of the sealing flange is adjacent to the region, wherein the fixing element is annular in shape, the sealing flange further comprising a radial mounting portion, wherein the radial mounting portion is mounted in a manner to bear axially against the front surface of the first ring, wherein the radial mounting portion is provided with a free end edge situated radially between a bore and an outer surface of the first ring, wherein the fixing element covers a part of an internal face of the sealing flange, wherein the internal face is situated radially on the side away from the free end edge when considering the mounting portion of the flange.

* * * * *